US012662566B2

(12) United States Patent
Sun et al.

(10) Patent No.: US 12,662,566 B2
(45) Date of Patent: Jun. 23, 2026

(54) POLYURETHANE FOAM AND METHODS OF FORMING THE SAME

(71) Applicant: SAINT-GOBAIN PERFORMANCE PLASTICS CORPORATION, Solon, OH (US)

(72) Inventors: Wenjun Sun, Shanghai (CN); Yue Dong, Shanghai (CN)

(73) Assignee: SAINT-GOBAIN PERFORMANCE PLASTICS CORPORATION, Malvern, PA (US)

( * ) Notice: Subject to any disclaimer, the term of this patent is extended or adjusted under 35 U.S.C. 154(b) by 0 days.

(21) Appl. No.: 18/147,443

(22) Filed: Dec. 28, 2022

(65) Prior Publication Data

US 2023/0212346 A1 Jul. 6, 2023

Related U.S. Application Data

(60) Provisional application No. 63/266,745, filed on Jan. 13, 2022.

(30) Foreign Application Priority Data

Dec. 30, 2021 (CN) .......................... 202111651538.5

(51) Int. Cl.

| | |
|---|---|
| *C08G 18/32* | (2006.01) |
| *C08G 18/40* | (2006.01) |
| *C08G 18/42* | (2006.01) |
| *C08G 18/48* | (2006.01) |
| *C08G 18/63* | (2006.01) |
| *C08G 18/65* | (2006.01) |
| *C08G 18/66* | (2006.01) |
| *C08G 18/76* | (2006.01) |
| *C08G 101/00* | (2006.01) |

(52) U.S. Cl.
CPC ......... *C08G 18/48* (2013.01); *C08G 18/3218* (2013.01); *C08G 18/4277* (2013.01); *C08G 18/632* (2013.01); *C08G 18/6681* (2013.01); *C08G 2101/00* (2013.01); *C08G 2110/0041* (2021.01)

(58) Field of Classification Search
CPC ...................... C08G 18/3206; C08G 18/4018; C08G 18/42; C08G 18/4202; C08G 18/4277; C08G 18/4804; C08G 2110/0041
See application file for complete search history.

(56) References Cited

U.S. PATENT DOCUMENTS

| | | | |
|---|---|---|---|
| 3,467,605 A | 9/1969 | Abercrombie et al. | |
| 3,915,908 A | 10/1975 | Mao et al. | |
| 4,258,137 A | 3/1981 | Cogliano | |
| 4,546,122 A | 10/1985 | Radovich et al. | |
| 4,927,861 A | 5/1990 | Souto et al. | |
| 5,091,497 A | 2/1992 | Grogler et al. | |
| 5,254,597 A | 10/1993 | Horn et al. | |
| 5,519,068 A | 5/1996 | Okada et al. | |
| 5,852,065 A | 12/1998 | Frey et al. | |
| 6,046,249 A | 4/2000 | Tobias et al. | |
| 6,326,412 B1 | 12/2001 | Weber et al. | |
| 6,395,796 B1 * | 5/2002 | Ghobary ............ | C08G 18/1875 521/131 |
| 6,455,603 B1 | 9/2002 | Fogg | |
| 6,455,606 B1 | 9/2002 | Kaku et al. | |
| 6,559,196 B2 | 5/2003 | Narayan et al. | |
| 7,456,229 B2 | 11/2008 | Hager et al. | |
| 7,511,082 B2 | 3/2009 | Nakamura et al. | |
| 7,601,761 B2 | 10/2009 | Clatty et al. | |
| 7,947,755 B2 | 5/2011 | Nakamura et al. | |
| 7,960,444 B2 | 6/2011 | Lysenko et al. | |
| 8,048,935 B2 | 11/2011 | Heraldo et al. | |
| 8,138,235 B2 | 3/2012 | Yano et al. | |
| 8,148,437 B2 | 4/2012 | Ortalda et al. | |
| 8,222,311 B2 | 7/2012 | Masuda et al. | |
| 8,491,992 B2 | 7/2013 | Schmidt et al. | |
| 8,552,078 B2 | 10/2013 | Vedage et al. | |
| 8,680,211 B2 | 3/2014 | Shutov et al. | |

(Continued)

FOREIGN PATENT DOCUMENTS

| | | |
|---|---|---|
| BY | 3291 B1 | 3/2000 |
| CN | 1135245 C | 1/2004 |

(Continued)

OTHER PUBLICATIONS

International Search Report and Written Opinion for PCT Application No. PCT/US2022/082470, dated May 1, 2023, 9 pages.

(Continued)

*Primary Examiner* — Melissa A Rioja
(74) *Attorney, Agent, or Firm* — Abel Schillinger, LLP; Chi Suk Kim

(57) ABSTRACT

The subject application relates to polyurethane foam and methods of forming the same. A polyurethane foam may include a polyurethane foam may include a first polyol component, a second polyol component, and a third polyol component. The first polyol component may include at least one component selected from the group of a polyether polyol and a polyester polyol. The second polyol component may include a polyether polyol. The third polyol component may include a grafted polyether polyol. The polyurethane foam may have a density of at least about 100 kg/m³ and not greater than about 800 kg/m³. The polyurethane foam may have an adjusted compression force deflection to density ratio of at least about 0.3.

19 Claims, 1 Drawing Sheet

(56) References Cited

U.S. PATENT DOCUMENTS

| | | | |
|---|---|---|---|
| 9,447,223 | B2 | 9/2016 | Burdeniuc et al. |
| 9,512,259 | B2 | 12/2016 | Allen et al. |
| 9,598,548 | B2 | 3/2017 | Mueller-Cristadoro et al. |
| 9,670,307 | B2 | 6/2017 | Neff et al. |
| 9,688,830 | B2 | 6/2017 | Emmrich-Smolczyk et al. |
| 9,815,931 | B2 | 11/2017 | Prissok et al. |
| 10,023,683 | B2 | 7/2018 | Bender et al. |
| 10,189,963 | B2 | 1/2019 | Burdeniuc et al. |
| 10,239,985 | B2 | 3/2019 | Adkins et al. |
| 10,421,832 | B2 | 9/2019 | Burdeniuc et al. |
| 10,472,459 | B2 | 11/2019 | Burdeniuc |
| 10,759,894 | B2 | 9/2020 | Wang et al. |
| 10,829,608 | B2 | 11/2020 | Martin |
| 10,870,723 | B2 | 12/2020 | Glos |
| 11,512,229 | B2 * | 11/2022 | Diao .......................... C09J 7/30 |
| 2002/0062097 | A1 | 5/2002 | Simpson |
| 2002/0169227 | A1 | 11/2002 | Allen et al. |
| 2003/0040548 | A1 | 2/2003 | Gilman et al. |
| 2004/0014829 | A1 | 1/2004 | Neff et al. |
| 2005/0124711 | A1 | 6/2005 | Cameron et al. |
| 2006/0217516 | A1 | 9/2006 | Casati et al. |
| 2008/0064844 | A1 | 3/2008 | Nagaraj et al. |
| 2008/0132594 | A1 | 6/2008 | Iwase |
| 2008/0234402 | A1 | 9/2008 | Lehmann et al. |
| 2010/0160470 | A1 | 6/2010 | Smiecinski et al. |
| 2010/0190880 | A1 | 7/2010 | Kamm et al. |
| 2010/0227939 | A1 | 9/2010 | Mohmeyer et al. |
| 2010/0323182 | A1 * | 12/2010 | Hashiba .................. B32B 27/32 |
| | | | 428/297.4 |
| 2011/0020549 | A1 | 1/2011 | Comert et al. |
| 2012/0101181 | A1 | 4/2012 | Munshi et al. |
| 2013/0059935 | A1 * | 3/2013 | Torres ................... C08G 18/42 |
| | | | 521/137 |
| 2013/0225705 | A1 | 8/2013 | Plaver et al. |
| 2013/0289149 | A1 | 10/2013 | Thoen et al. |
| 2015/0322194 | A1 * | 11/2015 | Schmidt ................ C08J 9/0066 |
| | | | 521/106 |
| 2016/0229972 | A1 | 8/2016 | Frisch, Jr. |
| 2016/0304690 | A1 * | 10/2016 | Takemoto .............. C08J 9/0061 |
| 2018/0044463 | A1 | 2/2018 | Gunther et al. |
| 2018/0086872 | A1 | 3/2018 | Otero Martinez et al. |
| 2019/0055343 | A1 | 2/2019 | Combs et al. |
| 2019/0185611 | A1 | 6/2019 | Mueller-Cristadoro et al. |
| 2019/0367695 | A1 * | 12/2019 | Zhang .................... C08K 5/103 |
| 2019/0367770 | A1 | 12/2019 | Bruning et al. |
| 2020/0048399 | A1 | 2/2020 | Allen et al. |
| 2020/0140600 | A1 | 5/2020 | O'Brien et al. |
| 2020/0208018 | A1 * | 7/2020 | Diao ..................... C08J 9/0066 |
| 2020/0239621 | A1 | 7/2020 | Glos |
| 2021/0102040 | A1 * | 4/2021 | Adkins ................ C08G 18/632 |
| 2021/0163661 | A1 | 6/2021 | Jacobmeier et al. |
| 2021/0163746 | A1 | 6/2021 | Dursen et al. |
| 2021/0189054 | A1 * | 6/2021 | Chen .................. C08G 18/3206 |
| 2021/0301069 | A1 * | 9/2021 | Meng .................. C08G 18/485 |
| 2022/0089806 | A1 * | 3/2022 | Gao ....................... C08G 18/42 |
| 2024/0199789 | A1 * | 6/2024 | Kiriyama ........... C08G 18/4808 |

FOREIGN PATENT DOCUMENTS

| | | | |
|---|---|---|---|
| CN | 101486788 | A | 7/2009 |
| CN | 101486788 | B | 9/2011 |
| CN | 101889038 | B | 7/2012 |
| CN | 103102469 | A | 5/2013 |
| CN | 102197071 | B | 10/2013 |
| CN | 104066759 | A | 9/2014 |
| CN | 103102469 | B | 11/2014 |
| CN | 105555825 | A | 5/2016 |
| CN | 103923291 | B | 4/2017 |
| CN | 105229047 | B | 7/2018 |
| CN | 108264624 | A | 7/2018 |
| CN | 105647165 | B | 10/2018 |
| CN | 106414533 | B | 3/2020 |
| CN | 110922555 | A | 3/2020 |
| CN | 111333810 | A | 6/2020 |
| CN | 112111146 | A | 12/2020 |
| CN | 112679693 | A | 4/2021 |
| CN | 110054744 | B | 6/2021 |
| CN | 112876642 | A | 6/2021 |
| CS | 273342 | B2 | 3/1991 |
| DE | 10352690 | A1 | 6/2005 |
| EP | 811645 | A2 | 12/1997 |
| EP | 965608 | A2 | 12/1999 |
| EP | 1361239 | B1 | 11/2005 |
| EP | 1344787 | B1 | 11/2006 |
| EP | 1985642 | A1 | 10/2008 |
| EP | 2115050 | B1 | 9/2011 |
| EP | 2677030 | A1 | 12/2013 |
| EP | 2799459 | A1 | 11/2014 |
| EP | 2886369 | A1 | 6/2015 |
| EP | 2888318 | B1 | 5/2016 |
| EP | 2820058 | B1 | 9/2016 |
| EP | 3133097 | A1 | 2/2017 |
| EP | 3483209 | A1 | 5/2019 |
| EP | 3812409 | A1 | 4/2021 |
| EP | 3830168 | A1 | 6/2021 |
| EP | 4342923 | A1 | 3/2024 |
| GB | 1177097 | A | 1/1970 |
| IN | 201309552 | P4 | 12/2014 |
| IN | 201811017729 | A | 11/2019 |
| JP | 11256031 | A | 9/1999 |
| JP | 3740266 | B2 | 2/2006 |
| JP | 4196270 | B2 | 12/2008 |
| JP | 4468106 | B2 | 5/2010 |
| JP | 2011046038 | A | 3/2011 |
| JP | 4948895 | B2 | 6/2012 |
| JP | 4948901 | B2 | 6/2012 |
| JP | 5206123 | B2 | 6/2013 |
| JP | 5552280 | B2 | 7/2014 |
| JP | 2017008280 | A | 1/2017 |
| JP | 2017082165 | A | 5/2017 |
| JP | 2019001334 | A | 1/2019 |
| KR | 100541314 | B1 | 1/2006 |
| KR | 100797425 | B1 | 1/2008 |
| KR | 2008053219 | A | 6/2008 |
| KR | 20160002047 | A | 1/2016 |
| RU | 2579576 | C2 | 4/2016 |
| SU | 1497189 | A1 | 7/1989 |
| TW | 201936740 | A | 9/2019 |
| WO | 8504410 | A1 | 10/1985 |
| WO | 1994020568 | A1 | 9/1994 |
| WO | 9940138 | A1 | 8/1999 |
| WO | 0200750 | A1 | 1/2002 |
| WO | 02062863 | A1 | 8/2002 |
| WO | 2005080464 | A1 | 9/2005 |
| WO | 2006034640 | A1 | 4/2006 |
| WO | 2008058097 | A2 | 5/2008 |
| WO | 2010105966 | A1 | 9/2010 |
| WO | 2011118910 | A2 | 9/2011 |
| WO | 2011125008 | A1 | 10/2011 |
| WO | 2012101086 | A1 | 8/2012 |
| WO | 2012163279 | A1 | 12/2012 |
| WO | 2017053064 | A1 | 3/2017 |
| WO | 2020035395 | A1 | 2/2020 |
| WO | 2020040117 | A1 | 2/2020 |
| WO | WO-2020024231 | A1 * | 2/2020 | ............ C08G 18/08 |
| WO | 2020059831 | A1 | 3/2020 |
| WO | 2020107363 | A1 | 6/2020 |
| WO | 2020136239 | A1 | 7/2020 |
| WO | 2021067538 | A1 | 4/2021 |
| WO | 2021067553 | A1 | 4/2021 |
| WO | 2021094239 | A1 | 5/2021 |
| WO | 2023129960 | A1 | 7/2023 |

OTHER PUBLICATIONS

Supplementary European Search Report for European Application No. 22917530.2, dated Nov. 14, 2025, 3 pages.

* cited by examiner

100
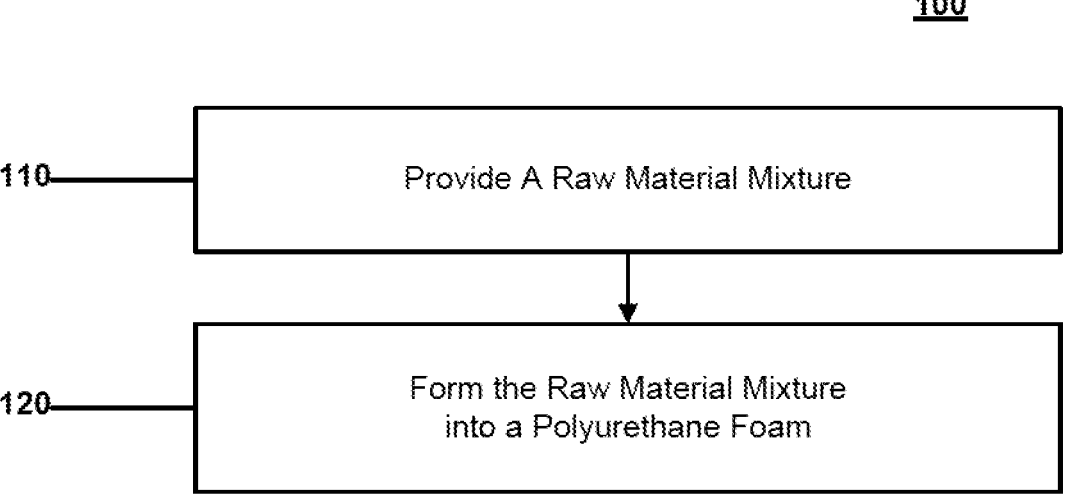

POLYURETHANE FOAM AND METHODS OF FORMING THE SAME

CROSS-REFERENCE TO RELATED APPLICATIONS

This application claims priority to Chinese Patent Application No. 202111651538.5, filed Dec. 30, 2021, entitled "POLYURETHANE FOAM AND METHODS OF FORMING THE SAME," by Wenjun SUN et al., which is assigned to the current assignee hereof and incorporated herein by reference in its entirety. This application further claims priority under 35 U.S.C. § 119(e) to U.S. Provisional Patent Application No. 63/266,745, filed Jan. 13, 2022, entitled "POLYURETHANE FOAM AND METHODS OF FORM-ING THE SAME," by Wenjun SUN et al., which is assigned to the current assignee hereof and incorporated herein by reference in its entirety.

FIELD OF THE DISCLOSURE

The present application relates to a polyurethane foam and methods of forming the same, more particularly, the present disclosure related to a polyurethane foam having improved performance and methods of forming the same.

BACKGROUND

Polyurethane foams are widely used in applications of construction, transportation, and electronics. However, such polyurethanes foams often include specific characteristics that make them prone specific safety issues. For example, such polyurethane foams are generally prone to rapid fire growth due to their inherent chemical properties (i.e., the "—NH—COO— groups" of the polyurethane foam cause lower decomposition temperature than many other poly-mers) and physical properties (i.e., low density of the polyurethane causes severe dripping during combustion and porous structure promotes oxygen and heat transfer). Accordingly, polyurethane foams formulations with improved safety characteristics are desired.

SUMMARY

According to a first aspect, a polyurethane foam may include a first polyol component, a second polyol compo-nent, and a third polyol component. The first polyol com-ponent may include at least one component selected from the group of a polyether polyol and a polyester polyol. The second polyol component may include a polyether polyol. The third polyol component may include a grafted polyether polyol. The polyurethane foam may have a density of at least about 100 kg/m³ and not greater than about 800 kg/m³. The polyurethane foam may have an adjusted compression force deflection to density ratio of at least about 0.3, where the adjusted compression force deflection to density ratio is equal to CFD70/(D^2.6), where the CFD70 is equal to the compression force deflection of the polyurethane foam in Pa measured at 23° C., 70% compressive strain, and D is equal to the density of the polyurethane foam in kg/m³.

According to yet another aspect, a method of forming a polyurethane foam may include providing a raw material mixture and forming the raw material mixture into a poly-urethane foam. The raw material mixture may include a raw first polyol component, a raw second polyol component, and a raw third polyol component. The raw first polyol compo-nent may include at least one component selected from the group of a polyether polyol and a polyester polyol. The raw second polyol component may include a polyether polyol. The raw third polyol component may include a grafted polyether polyol. The polyurethane foam may have a density of at least about 100 kg/m³ and not greater than about 800 kg/m³. The polyurethane foam may have an adjusted com-pression force deflection to density ratio of at least about 0.3, where the adjusted compression force deflection to density ratio is equal to CFD70/(D^2.6), where the CFD70 is equal to the compression force deflection of the polyurethane foam in Pa measured at 23° C., 70% compressive strain, and D is equal to the density of the polyurethane foam in kg/m³.

BRIEF DESCRIPTION OF THE DRAWINGS

Embodiments are illustrated by way of example and are not limited to the accompanying FIGURES.

FIG. 1 includes a diagram showing a polyurethane foam forming method 100 according to embodiments described herein.

Skilled artisans appreciate that elements in the figures are illustrated for simplicity and clarity and have not necessarily been drawn to scale.

DETAILED DESCRIPTION

The following discussion will focus on specific imple-mentations and embodiments of the teachings. The detailed description is provided to assist in describing certain embodiments and should not be interpreted as a limitation on the scope or applicability of the disclosure or teachings. It will be appreciated that other embodiments can be used based on the disclosure and teachings as provided herein.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

Embodiments described herein are generally directed to a polyurethane foam and methods of forming the same. More particularly, embodiments described herein are directed to a polyurethane foam having superior compression perfor-mance, and methods of forming the same.

For purposes of illustration, FIG. 1 includes a diagram showing a polyurethane foam forming method 100 accord-ing to particular embodiments described herein. The poly-urethane forming method 100 may include a first step 110 of providing a raw material mixture and a second step 120 of forming the raw material mixture into a polyurethane foam.

Referring to the first step 110, according to certain embodiments, the raw material mixture may include a raw first polyol component, a raw second polyol component, and a raw third polyol component.

According to certain embodiments, the raw material mixture may include a particular content of raw first polyol component. For example, the raw material mixture may include a content of the raw first polyol component of at least about 1 wt. % for a total weight of the raw material mixture, such as, at least about 2 wt. % or at least about 3 wt. % or at least about 4 wt. % or at least about 5 wt. % or at least about 10 wt. % or at least about 15 wt. % or at least about 20 wt. % or even at least about 25 wt. %. According to yet other embodiments, the raw material mixture may include a content of the raw first polyol component of not greater than about 50 wt. % for a total weight of the raw material mixture, such as, not greater than about 55 wt. % or not greater than about 50 wt. % or not greater than about 45 wt. % or not greater than about 40 wt. % or not greater than about 35 wt. % or even not greater than about 30 wt. %. It will be appreciated that the content of the raw first polyol component in the raw material mixture may be within a range between any of the minimum and maximum values noted above. It will be further appreciated that the content of the raw first polyol component in the raw material mixture may be any value between any of the minimum and maximum values noted above.

According to yet other embodiments, the raw first polyol component may have a particular OH number. For example, the raw first polyol component may have an OH number of at least about 20 KOH mg/g, such as, at least about 25 KOH mg/g or at least about 30 KOH mg/g or at least about 35 KOH mg/g or at least about 40 KOH mg/g or even at least about 45 KOH mg/g or even at least about 50 KOH mg/g or even at least about 55 KOH mg/g or even at least about 60 KOH mg/g. According to still other embodiments, the raw first polyol component may have an OH number of not greater than about 100 KOH mg/g, such as, not greater than about 95 KOH mg/g or not greater than about 90 KOH mg/g or not greater than about 85 KOH mg/g or not greater than about 80 KOH mg/g or not greater than about 75 KOH mg/g or not greater than about 70 KOH mg/g or even not greater than about 65 KOH mg/g. It will be appreciated that the OH number of the raw first polyol component may be within a range between any of the minimum and maximum values noted above. It will be further appreciated that the OH number of the raw first polyol component may be any value between any of the minimum and maximum values noted above.

According to still other embodiments, the raw first polyol component may include polyether polyols, polyester polyols, polymer polyols, bio-based polyols or combinations thereof.

According to yet other embodiments, the raw first polyol component may have a particular functionality. For example, the raw first polyol component may have a functionality of at least 2, such as, at least 2.5 or at least 3 or at least 3.5 or at least 4 or even at least 5. According to still other embodiments, the raw first polyol component may have a functionality of not greater than about 6, such as, not greater than about 5 or not greater than about 4 or not greater than about 3 or even not greater than about 2. It will be appreciated that the functionality of the raw first polyol component may be within a range between any of the minimum and maximum values noted above. It will be further appreciated that the functionality of the raw first polyol component may be any value between any of the minimum and maximum values noted above.

According to other embodiments, the raw first polyol component may have a particular molecular mass. For example, the raw first polyol component may have a molecular mass of at least about 2000 g/mol, such as, at least about 2100 g/mol or at least about 2200 g/mol or at least about 2300 g/mol or at least about 2400 g/mol or at least about 2500 g/mol or at least about 2600 g/mol or at least about 2700 g/mol or at least about 2800 g/mol or at least about 2900 g/mol or even at least about 3000 g/mol. According to still other embodiments, the raw first polyol component may have a molecular mass of not greater than about 8000 g/mol, such as, not greater than about 7800 g/mol or not greater than about 7500 g/mol or not greater than about 7300 g/mol or not greater than about 7000 g/mol or not greater than about 6800 g/mol or not greater than about 6500 g/mol or not greater than about 6300 g/mol or not greater than about 6000 g/mol or not greater than about 5800 g/mol or not greater than about 5500 g/mol or not greater than about 5200 g/mol or not greater than about 5000 g/mol or not greater than about 4800 g/mol or not greater than about 4500 g/mol or not greater than about 4300 g/mol or not greater than about 4000 g/mol or not greater than about 3800 g/mol or not greater than about 3500 g/mol or even not greater than about 3300 g/mol. It will be appreciated that the molecular mass of the raw first polyol component may be within a range between any of the minimum and maximum values noted above. It will be further appreciated that the molecular mass of the raw first polyol component may be any value between any of the minimum and maximum values noted above.

According to still other embodiments, the raw first polyol component may be prepared by a condensation of dicarboxylic acid and a polyol.

According to certain embodiments, the raw material mixture may include a particular content of raw second polyol component. For example, the raw material mixture may include a content of the raw second polyol component of at least about 1 wt. % for a total weight of the raw material mixture, such as, at least about 2 wt. % or at least about 3 wt. % or at least about 4 wt. % or at least about 5 wt. % or at least about 6 wt. % or at least about 7 wt. % or at least about 8 wt. % or at least about 9 wt. % or even at least about 10 wt. %. According to yet other embodiments, the raw material mixture may include a content of the raw second polyol component of not greater than about 20 wt. % for a total weight of the raw material mixture, such as, not greater than about 19 wt. % or not greater than about 18 wt. % or not greater than about 17 wt. % or even not greater than about 16 wt. %. It will be appreciated that the content of the raw second polyol component in the raw material mixture may be within a range between any of the minimum and maximum values noted above. It will be further appreciated that the content of the raw second polyol component in the raw material mixture may be any value between any of the minimum and maximum values noted above.

According to yet other embodiments, the raw second polyol component may have a particular OH number. For example, the raw second polyol component may have an OH number of at least about 200 KOH mg/g, such as, at least about 220 KOH mg/g or at least about 240 KOH mg/g or at least about 260 KOH mg/g or at least about 280 KOH mg/g or at least about 300 KOH mg/g or at least about 320 KOH mg/g or at least about 340 KOH mg/g or at least about 360 KOH mg/g or at least about 380 KOH mg/g or even at least about 400 KOH mg/g. According to still other embodiments, the raw second polyol component may have an OH number of not greater than about 800 KOH mg/g, such as, not greater than about 740 KOH mg/g or not greater than about 730 KOH mg/g or not greater than about 720 KOH mg/g or not greater than about 700 KOH mg/g or not greater than about 680 KOH mg/g or not greater than about 660 KOH mg/g or not greater than about 640 KOH mg/g or not greater than about 620 KOH mg/g or not greater than about 600 KOH mg/g or not greater than about 580 KOH mg/g or not greater than about 560 KOH mg/g or not greater than about 540 KOH mg/g or not greater than about 520 KOH mg/g or even not greater than about 500 KOH mg/g. It will be appreciated that the OH number of the raw second polyol component may be within a range between any of the minimum and maximum values noted above. It will be further appreciated that the OH number of the raw second polyol component may be any value between any of the minimum and maximum values noted above.

According to still other embodiments, the raw second polyol component may have a particular functionality. For example, the raw second polyol component may have a functionality of at least about 3, such as, at least about 4 or at least about 5 or even at least about 6. According to still other embodiments, the raw second polyol component may have a functionality of not greater than about 8, such as, not greater than about 7 or not greater than about 6 or even not greater than about 5. It will be appreciated that the functionality of the raw second polyol component may be within a range between any of the minimum and maximum values noted above. It will be further appreciated that the functionality of the raw second polyol component may be any value between any of the minimum and maximum values noted above.

According to other embodiments, the raw second polyol component may have a particular molecular mass. For example, the raw second polyol component may have a molecular mass of at least about 200 g/mol, such as, at least about 210 g/mol or at least about 220 g/mol or at least about 230 g/mol or at least about 240 g/mol or at least about 250 g/mol or at least about 260 g/mol or even at least about 270 g/mol. According to still other embodiments, the raw second polyol component may have a molecular mass of not greater than about 2000 g/mol, such as, not greater than about 1900 g/mol or not greater than about 1800 g/mol or not greater than about 1700 g/mol or not greater than about 1600 g/mol or not greater than about 1500 g/mol or not greater than about 1400 g/mol or not greater than about 1300 g/mol or not greater than about 1200 g/mol or not greater than about 1100 g/mol or not greater than about 1000 g/mol or not greater than about 900 g/mol or not greater than about 800 g/mol or not greater than about 700 g/mol or not greater than about 600 g/mol or not greater than about 500 g/mol or not greater than about 400 g/mol or even not greater than about 300 g/mol. It will be appreciated that the molecular mass of the raw second polyol component may be within a range between any of the minimum and maximum values noted above. It will be further appreciated that the molecular mass of the raw second polyol component may be any value between any of the minimum and maximum values noted above.

According to certain embodiments, the raw material mixture may include a particular content of raw third polyol component. For example, the raw material mixture may include a content of the raw third polyol component of at least about 1 wt. % for a total weight of the raw material mixture, such as, at least about 2 wt. % or at least about 3 wt. % or at least about 4 wt. % or at least about 5 wt. % or at least about 6 wt. % or at least about 7 wt. % or at least about 8 wt. % or at least about 9 wt. % or at least about 10 wt. % or at least about 11 wt. % or at least about 13 wt. % or at least about 15 wt. % or at least about 17 wt. % or at least about 19 wt. % or at least about 21 wt. % or at least about 23 wt. % or at least about 25 wt. % or even at least about 27 wt. %. According to yet other embodiments, the raw material mixture may include a content of the raw third polyol component of not greater than about 50 wt. % for a total weight of the raw material mixture, such as, not greater than about 48 wt. % or not greater than about 45 wt. % or not greater than about 43 wt. % or not greater than about 40 wt. % or not greater than about 38 wt. % or not greater than about 35 wt. % or not greater than about 33 wt. % or not greater than about 30 wt. % or even not greater than about 28 wt. %. It will be appreciated that the content of the raw third polyol component in the raw material mixture may be within a range between any of the minimum and maximum values noted above. It will be further appreciated that the content of the raw third polyol component in the raw material mixture may be any value between any of the minimum and maximum values noted above.

According to yet other embodiments, the raw third polyol component may have a particular solid content by weight. For example, the raw third polyol component may have a solid content by weight of at least about 10 wt. %, such as, at least about 12 wt. % or at least about 14 wt. % or at least about 16 wt. % or at least about 18 wt. % or at least about 20 wt. % or at least about 22 wt. % or at least about 24 wt. % or at least about 26 wt. % or at least about 28 wt. % or even at least about 30 wt. %. According to still other embodiments, the raw third polyol component may have a solid content by weight of not greater than about 60 wt. %, such as, not greater than about 55 wt. % or not greater than about 50 wt. % or not greater than about 45 wt. % or not greater than about 40 wt. % or not greater than about 35 wt. %. It will be appreciated that the solid content by weight of the raw third polyol component may be within a range between any of the minimum and maximum values noted above. It will be further appreciated that the solid content by weight of the raw third polyol component may be any value between any of the minimum and maximum values noted above.

According to still other embodiments, the raw third polyol component may be produced by a graft polymerization of parent polyoxypropylene ether polyol and vinyl monomer in the presence of an initiator.

According to still other embodiments, the parent polyoxypropylene ether polyol may have a particular functionality. For example, the parent polyoxypropylene ether polyol may have a functionality of at least about 2 or at least about 2.2 or at least about 2.4 or at least about 2.6 or at least about 2.8. According to still other embodiments, the parent polyoxypropylene ether polyol may have a functionality of not greater than about 4 or not greater than about 3.8 or not greater than about 3.6 or not greater than about 3.4 or not greater than about 3.2. It will be appreciated that the functionality of the parent polyoxypropylene ether polyol may be within a range between any of the minimum and maximum values noted above. It will be further appreciated that the functionality of the parent polyoxypropylene ether polyol may be any value between any of the minimum and maximum values noted above.

According to other embodiments, the parent polyoxypropylene ether polyol may have a particular molecular mass. For example, the parent polyoxypropylene ether polyol may have a molecular mass of at least about 2000 g/mol, such as, at least about 2250 g/mol or at least about 2500 g/mol or at least about 2750 g/mol or at least about 3000 g/mol or at least about 3500 g/mol or at least about 4000 g/mol or at least about 4500 g/mol or even at least about 5000 g/mol. According to still other embodiments, the parent polyoxypropylene ether polyol may have a molecular mass of not greater than about 12000 g/mol, such as, not greater than about 11750 g/mol or not greater than about 11500 g/mol or not greater than about 11250 g/mol or not greater than about 11000 g/mol or not greater than about 10750 g/mol or not greater than about 10500 g/mol or not greater than about 10000 g/mol or not greater than about 9500 g/mol or not greater than about 9000 g/mol or not greater than about 8500 g/mol or at least about 8000 g/mol or at least about 7500 g/mol or at least about 7000 g/mol or even not greater than about 6500 g/mol. It will be appreciated that the molecular mass of the parent polyoxypropylene ether polyol may be within a range between any of the minimum and maximum values noted above. It will be further appreciated that the molecular mass of the parent polyoxypropylene ether polyol may be any value between any of the minimum and maximum values noted above.

According to still other embodiments, the raw material mixture may further include a raw fourth polyol component. According to still other embodiments, the raw fourth polyol component comprises a polycaprolactone polyol.

According to certain embodiments, the raw material mixture may include a particular content of raw fourth polyol component. For example, the raw material mixture may include a content of the raw fourth polyol component of at least about 1 wt. % for a total weight of the raw material mixture, such as, at least about 3 wt. % or at least about 5 wt. % or at least about 8 wt. % or at least about 10 wt. % or at least about 13 wt. % or even at least about 15 wt. %. According to yet other embodiments, the raw material mixture may include a content of the raw fourth polyol component of not greater than about 25 wt. % for a total weight of the raw material mixture, such as, not greater than about 24 wt. % or not greater than about 23 wt. % or not greater than about 22 wt. % or not greater than about 21 wt. % or not greater than about 20 wt. % or not greater than about 19 wt. % or not greater than about 18 wt. % or not greater than about 17 wt. % or even not greater than about 16 wt. %. It will be appreciated that the content of the raw fourth polyol component in the raw material mixture may be within a range between any of the minimum and maximum values noted above. It will be further appreciated that the content of the raw fourth polyol component in the raw material mixture may be any value between any of the minimum and maximum values noted above.

According to yet other embodiments, the raw fourth polyol component may have a particular OH number. For example, the raw fourth polyol component may have an OH number of at least about 40 KOH mg/g, such as, at least about 43 KOH mg/g or at least about 45 KOH mg/g or at least about 50 KOH mg/g or at least about 70 KOH mg/g or at least about 90 KOH mg/g or at least about 110 KOH mg/g or at least about 150 KOH mg/g or even at least about 200 KOH mg/g. According to still other embodiments, the raw fourth polyol component may have an OH number of not greater than about 600 KOH mg/g, such as, not greater than about 550 KOH mg/g or not greater than about 500 KOH mg/g or not greater than about 450 KOH mg/g or not greater than about 400 KOH mg/g or not greater than about 350 KOH mg/g or not greater than about 300 KOH mg/g or not greater than about 250 KOH mg/g. It will be appreciated that the OH number of the raw fourth polyol component may be within a range between any of the minimum and maximum values noted above. It will be further appreciated that the OH number of the raw fourth polyol component may be any value between any of the minimum and maximum values noted above.

According to still other embodiments, the raw fourth polyol component may have a particular functionality. For example, the raw third polyol component may have a functionality of at least about 2 or at least about 2.2 or at least about 2.4 or at least about 2.6 or at least about 2.8. According to still other embodiments, the raw fourth polyol component may have a functionality of not greater than about 4 or not greater than about 3.8 or not greater than about 3.6 or not greater than about 3.4 or not greater than about 3.2. It will be appreciated that the functionality of the raw fourth polyol component may be within a range between any of the minimum and maximum values noted above. It will be further appreciated that the functionality of the raw fourth polyol component may be any value between any of the minimum and maximum values noted above.

According to other embodiments, the raw fourth polyol component may have a particular molecular mass. For example, the raw fourth polyol component may have a molecular mass of at least about 200 g/mol, such as, at least about 210 g/mol or at least about 220 g/mol or at least about 230 g/mol or at least about 240 g/mol or at least about 250 g/mol or at least about 260 g/mol or even at least about 270 g/mol. According to still other embodiments, the raw fourth polyol component may have a molecular mass of not greater than about 2000 g/mol, such as, not greater than about 1900 g/mol or not greater than about 1800 g/mol or not greater than about 1700 g/mol or not greater than about 1600 g/mol or not greater than about 1500 g/mol or not greater than about 1400 g/mol or not greater than about 1300 g/mol or not greater than about 1200 g/mol or not greater than about 1100 g/mol or not greater than about 1000 g/mol or not greater than about 900 g/mol or not greater than about 800 g/mol or not greater than about 700 g/mol or not greater than about 600 g/mol or not greater than about 500 g/mol or not greater than about 400 g/mol or even not greater than about 300 g/mol. It will be appreciated that the molecular mass of the raw fourth polyol component may be within a range between any of the minimum and maximum values noted above. It will be further appreciated that the molecular mass of the raw fourth polyol component may be any value between any of the minimum and maximum values noted above.

According to still other embodiments, the raw material mixture may further include a raw catalyst component.

According to still other embodiments, the raw catalyst component may include metal catalysts containing metal component such as tin, cooper, lead, zinc, cobalt, or nickel, and amine catalysts such as tertiary amine or quaternary ammonium salt.

According to certain embodiments, the raw material mixture may include a particular content of raw catalyst component. For example, the raw material mixture may include a content of the raw catalyst component of at least about 0.1 wt. % for a total weight of the raw material mixture, such as, at least about 0.25 wt. % or at least about 0.5 wt. % or at least about 0.75 wt. % or at least about 1.0 wt. % or at least about 1.25 wt. % or even at least about 1.5 wt. %. According to yet other embodiments, the raw material mixture may include a content of the raw catalyst component of not greater than about 5 wt. % for a total weight of the raw material mixture, such as, not greater than about 4.75 wt. % or not greater than about 4.5 wt. % or not greater than about 4.25 wt. % or not greater than about 4.0 wt. % or not greater than about 3.75 wt. % or not greater than about 3.5 wt. % or not greater than about 3.25 wt. % or not greater than about 3.0 wt. % or not greater than about 2.75 wt. % or not greater than about 2.5 wt. % or not greater than about 2.25 wt. % or even not greater than about 2.0 wt. %. It will be appreciated that the content of the raw catalyst component in the raw material mixture may be within a range between any of the minimum and maximum values noted above. It will be further appreciated that the content of the raw catalyst component in the raw material mixture may be any value between any of the minimum and maximum values noted above.

According to still other embodiments, the raw material mixture may further include a raw filler component.

According to certain embodiments, the raw material mixture may include a particular content of raw filler component. For example, the raw material mixture may include a content of the raw filler component of at least about 0.1 wt. % for a total weight of the raw material mixture, such as, at least about 0.25 wt. % or at least about 0.5 wt. % or at least about 0.75 wt. % or at least about 1.0 wt. % or at least about 1.25 wt. % or even at least about 1.5 wt. %. According to yet other embodiments, the raw material mixture may include a content of the raw filler component of not greater than about 40 wt. % for a total weight of the raw material mixture, such as, not greater than about 37 wt. % or not greater than about 35 wt. % or not greater than about 32 wt. % or not greater than about 30 wt. % or not greater than about 27 wt. % or not greater than about 25 wt. % or not greater than about 22 wt. % or not greater than about 20 wt. % or not greater than about 18 wt. % or not greater than about 15 wt. % or not greater than about 12 wt. % or not greater than about 10 wt. % or not greater than about 7 wt. % or not greater than about 5 wt. % or even not greater than about 3 wt. %. It will be appreciated that the content of the raw filler component in the raw material mixture may be within a range between any of the minimum and maximum values noted above. It will be further appreciated that the content of the raw filler component in the raw material mixture may be any value between any of the minimum and maximum values noted above.

According to still other embodiments, the raw material mixture may further include a raw chain extender component.

According to still other embodiments, the raw chain extender component may include compounds with at least two isocyanate reactive groups such as diethylene glycol, triethylene glycol, dipropylene glycol, or tri propylene glycol.

According to certain embodiments, the raw material mixture may include a particular content of raw chain extender component. For example, the raw material mixture may include a content of the raw chain extender component of at least about 0.1 wt. % for a total weight of the raw material mixture, such as, at least about 0.25 wt. % or at least about 0.5 wt. % or at least about 0.75 wt. % or at least about 1.0 wt. % or at least about 1.25 wt. % or at least about 1.5 wt. % or at least about 1.75 wt. % or even at least about 2 wt. %. According to yet other embodiments, the raw material mixture may include a content of the raw chain extender component of not greater than about 7 wt. % for a total weight of the raw material mixture, such as, not greater than about 6.5 wt. % or not greater than about 6.0 wt. % or not greater than about 5.5 wt. % or not greater than about 5.0 wt. % or not greater than about 4.5 wt. % or not greater than about 4.0 wt. % or not greater than about 3.5 wt. % or not greater than about 3 wt. % or even not greater than about 2.5 wt. %. It will be appreciated that the content of the raw chain extender component in the raw material mixture may be within a range between any of the minimum and maximum values noted above. It will be further appreciated that the content of the raw chain extender component in the raw material mixture may be any value between any of the minimum and maximum values noted above.

According to still other embodiments, the raw material mixture may further include a raw surfactant agent component.

According to still other embodiments, the raw surfactant agent component may include aerosol, bentonite, polyuria compounds or combinations thereof.

According to certain embodiments, the raw material mixture may include a particular content of raw surfactant component. For example, the raw material mixture may include a content of the raw surfactant component of at least about 0.1 wt. % for a total weight of the raw material mixture, such as, at least about 0.25 wt. % or at least about 0.5 wt. % or at least about 0.75 wt. % or at least about 1.0 wt. % or at least about 1.25 wt. % or at least about 1.5 wt. % or at least about 1.75 wt. % or at least about 2.0 wt. % or at least about 2.25 wt. % or even at least about 2.5 wt. %. According to yet other embodiments, the raw material mixture may include a content of the raw surfactant component of not greater than about 7 wt. % for a total weight of the raw material mixture, such as, not greater than about 6.5 wt. % or not greater than about 6.0 wt. % or not greater than about 5.5 wt. % or not greater than about 5.0 wt. % or not greater than about 4.5 wt. % or not greater than about 4.0 wt. % or not greater than about 3.5 wt. % or even not greater than about 3.0 wt. %. It will be appreciated that the content of the raw surfactant component in the raw material mixture may be within a range between any of the minimum and maximum values noted above. It will be further appreciated that the content of the raw surfactant component in the raw material mixture may be any value between any of the minimum and maximum values noted above.

According to still other embodiments, the raw material mixture may further include a raw isocyanate component.

According to still other embodiments, the raw isocyanate component may include monomeric methylenediphenyl diisocyanate (MDI), modified MDI, polymeric MDI and combinations thereof.

According to certain embodiments, the raw material mixture may include a particular content of raw isocyanate component. For example, the raw material mixture may include a content of the raw isocyanate component of at least about 7.0 wt. % for a total weight of the raw material mixture, such as, at least about 8 wt. % or at least about 10 wt. % or at least about 11 wt. % or at least about 12 wt. % or at least about 13 wt. % or at least about 14 wt. % or at least about 16 wt. % or at least about 18 wt. % or even at least about 20 wt. %. According to yet other embodiments, the raw material mixture may include a content of the raw isocyanate component of not greater than about 40 wt. % for a total weight of the raw material mixture, such as, not greater than about 39 wt. % or not greater than about 38 wt. % or not greater than about 37 wt. % or not greater than about 35 wt. % or not greater than about 34 wt. % or not greater than about 32 wt. % or even not greater than about 30 wt. %. It will be appreciated that the content of the raw isocyanate component in the raw material mixture may be within a range between any of the minimum and maximum values noted above. It will be further appreciated that the content of the raw isocyanate component in the raw material mixture may be any value between any of the minimum and maximum values noted above.

According to yet other embodiments, forming the raw material mixture into a polyurethane foam may include foaming the raw material mixture to form a foamed material mixture. According to still other embodiments, forming the raw material mixture into a polyurethane foam may further include curing the foamed material mixture to form the polyurethane foam.

Referring now to the polyurethane foam formed according to embodiments described herein, the polyurethane foam may include a first polyol component, a second polyol component, and a third polyol component.

According to other embodiments, the polyurethane foam may have a particular adjusted compression force deflection to density ratio, where the adjusted compression force deflection to density ratio is equal to CFD70/(D^2.6), where the CFD70 is equal to the compression force deflection of the polyurethane foam in Pa measured at 23° C., 70% compressive strain, and D is equal to the density of the polyurethane foam in kg/m³. For example, the polyurethane foam may have an adjusted compression force deflection to density ratio of at least about 0.3, such as, at least about 0.4 or at least about 0.5 or at least about 0.6 or at least about 0.7. According to still other embodiments, the polyurethane foam may have an adjusted compression force deflection to density ratio of not greater than about 2.5, such as, not greater than about 2.3. It will be appreciated that the adjusted compression force deflection to density ratio of the polyurethane foam may be within a range between any of the minimum and maximum values noted above. It will be further appreciated that the adjusted compression force deflection to density ratio of the polyurethane foam may be any value between any of the minimum and maximum values noted above.

According to particular embodiments, the polyurethane foam may have a particular glass transition temperature as measured according to ASTM D7028. For example, the polyurethane foam may have a glass transition temperature of at least about 10° C., such as, at least about 13° C. or at least about 16° C. or at least about 20° C. or at least about 23° C. or at least about 26° C. or even at least about 30° C., at least about 35° C., at least about 37° C. or at least about 40° C. or at least about 42° C. or at least about 45° C. or at least about 47° C. or even at least about 50° C. According to still other embodiments, the polyurethane foam may have a glass transition temperature of not greater than about 85° C., such as not greater than about 83° C. or not greater than about 80° C. or not greater than about 78° C. or not greater than about 75° C. or not greater than about 73° C. or not greater than about 70° C. or not greater than about 68° C. or not greater than about 65° C. It will be appreciated that the glass transition temperature of the polyurethane foam may be within a range between any of the minimum and maximum values noted above. It will be further appreciated that the glass transition temperature of the polyurethane foam may be any value between any of the minimum and maximum values noted above.

According to yet other embodiments, the polyurethane foam may have a particular compression recovery ratio measured by 1) compressing the foam with a speed of 50 mm/min to 75% of the original thickness (T1), and holding for 1 min under this compression strain, 2) removing the stress and measure the thickness after half an hour (T2), and 3 calculating the compression recovery ratio as: 1−(T1−T2)/(0.25*T1). For example, the polyurethane form may have a compression recovery ratio of not less than 95.5%, or not less than 95.6%, or not less than 95.7%, or not less than 95.8%, or not less than 95.9%, or not less than 96.0%, or not less than 96.1%, or not less than 96.2%, or not less than 96.3%, or not less than 96.4%, not less than 96.5%, or not less than 96.6%, or not less than 96.7%, or not less than 96.8%, or not less than 96.9%, or not less than 97.0%, or not less than 97.1%, or not less than 97.2%, or not less than 97.3%, or not less than 97.4%, or not less than 97.5%, or not less than 97.6%, or not less than 97.7%, or not less than 97.8%, or not less than 97.9%, or not less than 98.0%, or not less than 98.1%, or not less than 98.2%, or not less than 98.3%, or not less than 98.4%, or not less than 98.5%. It will be appreciated that the compression recovery ratio of the polyurethane foam may be within a range between any of the values noted above. It will be further appreciated that the compression recovery ratio of the polyurethane foam may be any value between any of the values noted above.

According to still other embodiments, the polyurethane foam may have a particular density as measured according to ASTM #D3574. For example, the polyurethane foam may have a density of at least about 60 kg/m³, such as, at least about 75 kg/m³ or at least about 100 kg/m³ or at least about 125 kg/m³ or at least about 150 kg/m³ or at least about 175 kg/m³ or at least about 200 kg/m³ or at least about 225 kg/m³ or at least about 250 kg/m³ or at least about 275 kg/m³ or at least about 300 kg/m³ or at least about 325 kg/m³ or at least about 350 kg/m³ or at least about 375 kg/m³ or at least about 400 kg/m³ or at least about 425 kg/m³ or at least about 475 kg/m³ or at least about 500 kg/m³. According to still other embodiments, the polyurethane foam may have a density of not greater than about 790 kg/m³, such as, not greater than about 780 kg/m³ or not greater than about 770 kg/m³ or not greater than about 760 kg/m³ or not greater than about 750 kg/m³ or not greater than about 740 kg/m³ or not greater than about 730 kg/m³ or not greater than about 720 kg/m³ or not greater than about 710 kg/m³ or not greater than about 700 kg/m³. It will be appreciated that the density of the polyurethane foam may be within a range between any of the minimum and maximum values noted above. It will be further appreciated that the density of the polyurethane foam may be any value between any of the minimum and maximum values noted above.

According to certain embodiments, the polyurethane foam may include a particular content of first polyol component. For example, the polyurethane foam may include a content of the first polyol component of at least about 1 wt. % for a total weight of the polyurethane foam, such as, at least about 2 wt. % or at least about 3 wt. % or at least about 4 wt. % or at least about 5 wt. % or at least about 10 wt. % or at least about 15 wt. % or at least about 20 wt. % or even at least about 25 wt. %. According to yet other embodiments, the polyurethane foam may include a content of the first polyol component of not greater than about 50 wt. % for a total weight of the polyurethane foam, such as, not greater than about 55 wt. % or not greater than about 50 wt. % or even not greater than about 45 wt. %. It will be appreciated that the content of the first polyol component in the polyurethane foam may be within a range between any of the minimum and maximum values noted above. It will be further appreciated that the content of the first polyol component in the polyurethane foam may be any value between any of the minimum and maximum values noted above.

According to yet other embodiments, the first polyol component may have a particular OH number. For example, the first polyol component may have an OH number of at least about 20 KOH mg/g, such as, at least about 25 KOH mg/g or at least about 30 KOH mg/g or at least about 35

KOH mg/g or at least about 40 KOH mg/g or even at least about 45 KOH mg/g. According to still other embodiments, the first polyol component may have an OH number of not greater than about 100 KOH mg/g, such as, not greater than about 95 KOH mg/g or not greater than about 90 KOH mg/g or not greater than about 85 KOH mg/g or even not greater than about 80 KOH mg/g. It will be appreciated that the OH number of the first polyol component may be within a range between any of the minimum and maximum values noted above. It will be further appreciated that the OH number of the first polyol component may be any value between any of the minimum and maximum values noted above.

According to still other embodiments, the first polyol component may include polyether polyols, polyester polyols, polymer polyols, bio-based polyols or combinations thereof.

According to yet other embodiments, the first polyol component may have a particular functionality. For example, the phosphorous polyol component may have a functionality of at least 2, such as, at least 3 or at least 4 or even at least 5.

According to other embodiments, the first polyol component may have a particular molecular mass. For example, the first polyol component may have a molecular mass of at least about 2000 g/mol, such as, at least about 2100 g/mol or at least about 2200 g/mol or at least about 2300 g/mol or at least about 2400 g/mol or at least about 2500 g/mol or at least about 2600 g/mol or at least about 2700 g/mol or at least about 2800 g/mol or at least about 2900 g/mol or even at least about 3000 g/mol. According to still other embodiments, the first polyol component may have a molecular mass of not greater than about 8000 g/mol, such as, not greater than about 7800 g/mol or not greater than about 7500 g/mol or not greater than about 7300 g/mol or not greater than about 7000 g/mol or not greater than about 6800 g/mol or not greater than about 6500 g/mol or not greater than about 6300 g/mol or not greater than about 6000 g/mol or not greater than about 5800 g/mol or even not greater than about 5500 g/mol. It will be appreciated that the molecular mass of the first polyol component may be within a range between any of the minimum and maximum values noted above. It will be further appreciated that the molecular mass of the first polyol component may be any value between any of the minimum and maximum values noted above.

According to still other embodiments, the first polyol component may be produced by a condensation of polycarboxylic acids (and/or polycarboxylic acid derivatives) with polyhydric alcohols (and/or polyhydric alcohol derivatives), or by ring-opening polymerization of epoxy compounds in the presence of active hydrogen-containing compounds as initiators and catalysts.

According to certain embodiments, the polyurethane foam may include a particular content of second polyol component. For example, the polyurethane foam may include a content of the second polyol component of at least about 5 wt. % for a total weight of the polyurethane foam, such as, at least about 6 wt. % or at least about 7 wt. % or at least about 8 wt. % or at least about 9 wt. % or even at least about 10 wt. %. According to yet other embodiments, the polyurethane foam may include a content of the second polyol component of not greater than about 20 wt. % for a total weight of the polyurethane foam, such as, not greater than about 19 wt. % or not greater than about 18 wt. % or not greater than about 17 wt. % or even not greater than about 16 wt. %. It will be appreciated that the content of the second polyol component in the polyurethane foam may be within a range between any of the minimum and maximum values noted above. It will be further appreciated that the content of the second polyol component in the polyurethane foam may be any value between any of the minimum and maximum values noted above.

According to yet other embodiments, the second polyol component may have a particular OH number. For example, the second polyol component may have an OH number of at least about 200 KOH mg/g, such as, at least about 210 KOH mg/g or at least about 220 KOH mg/g or at least about 230 KOH mg/g or even at least about 240 KOH mg/g. According to still other embodiments, the second polyol component may have an OH number of not greater than about 800 KOH mg/g, such as, not greater than about 740 KOH mg/g or not greater than about 730 KOH mg/g or not greater than about 720 KOH mg/g or even not greater than about 710 KOH mg/g. It will be appreciated that the OH number of the second polyol component may be within a range between any of the minimum and maximum values noted above. It will be further appreciated that the OH number of the second polyol component may be any value between any of the minimum and maximum values noted above.

According to still other embodiments, the second polyol component may have a particular functionality. For example, the second polyol component may have a functionality of at least about 3, such as, at least about 4 or at least about 5 or even at least about 6. According to still other embodiments, the second polyol component may have a functionality of not greater than about 8, such as, not greater than about 7 or not greater than about 6 or even not greater than about 5. It will be appreciated that the functionality of the second polyol component may be within a range between any of the minimum and maximum values noted above. It will be further appreciated that the functionality of the second polyol component may be any value between any of the minimum and maximum values noted above.

According to other embodiments, the second polyol component may have a particular molecular mass. For example, the second polyol component may have a molecular mass of at least about 200 g/mol, such as, at least about 210 g/mol or at least about 220 g/mol or at least about 230 g/mol or at least about 240 g/mol or at least about 250 g/mol or at least about 260 g/mol or even at least about 270 g/mol. According to still other embodiments, the second polyol component may have a molecular mass of not greater than about 2000 g/mol, such as, not greater than about 1900 g/mol or not greater than about 1800 g/mol or not greater than about 1700 g/mol or not greater than about 1600 g/mol or not greater than about 1500 g/mol or not greater than about 1400 g/mol or even not greater than about 1300 g/mol. It will be appreciated that the molecular mass of the second polyol component may be within a range between any of the minimum and maximum values noted above. It will be further appreciated that the molecular mass of the second polyol component may be any value between any of the minimum and maximum values noted above.

According to certain embodiments, the polyurethane foam may include a particular content of third polyol component. For example, the polyurethane foam may include a content of the third polyol component of at least about 1 wt. % for a total weight of the polyurethane foam, such as, at least about 2 wt. % or at least about 3 wt. % or at least about 4 wt. % or at least about 5 wt. % or at least about 6 wt. % or at least about 7 wt. % or at least about 8 wt. % or at least about 9 wt. % or at least about 10 wt. % or even at least about 11 wt. %. According to yet other embodiments, the polyurethane foam may include a content of the third polyol component of not greater than about 50 wt. % for a total weight of the polyurethane foam, such as, not greater than about 48 wt. % or not greater than about 45 wt. % or not greater than about 43 wt. % or not greater than about 40 wt. % or not greater than about 38 wt. % or not greater than about 35 wt. % or not greater than about 33 wt. % or not greater than about 30 wt. % or even not greater than about 28 wt. %. It will be appreciated that the content of the third polyol component in the polyurethane foam may be within a range between any of the minimum and maximum values noted above. It will be further appreciated that the content of the third polyol component in the polyurethane foam may be any value between any of the minimum and maximum values noted above.

According to yet other embodiments, the third polyol component may have a particular solid content by weight. For example, the third polyol component may have a solid content by weight of at least about 10 wt. %, such as, at least about 12 wt. % or at least about 14 wt. % or at least about 16 wt. % or even at least about 18 wt. %. According to still other embodiments, the third polyol component may have a solid content by weight of not greater than about 60 wt. %, such as, not greater than about 55 wt. % or not greater than about 50 wt. % or not greater than about 45 wt. %. It will be appreciated that the solid content by weight of the third polyol component may be within a range between any of the minimum and maximum values noted above. It will be further appreciated that the solid content by weight of the third polyol component may be any value between any of the minimum and maximum values noted above.

According to still other embodiments, the third polyol component may be produced by a graft polymerization of parent polyoxypropylene ether polyol and vinyl monomer in the presence of an initiator.

According to still other embodiments, the parent polyoxypropylene ether polyol may have a particular functionality. For example, the parent polyoxypropylene ether polyol may have a functionality of at least about 2. According to still other embodiments, the parent polyoxypropylene ether polyol may have a functionality of not greater than about 4. It will be appreciated that the functionality of the parent polyoxypropylene ether polyol may be within a range between any of the minimum and maximum values noted above. It will be further appreciated that the functionality of the parent polyoxypropylene ether polyol may be any value between any of the minimum and maximum values noted above.

According to other embodiments, the parent polyoxypropylene ether polyol may have a particular molecular mass. For example, the parent polyoxypropylene ether polyol may have a molecular mass of at least about 2000 g/mol, such as, at least about 2250 g/mol or at least about 2500 g/mol or at least about 2750 g/mol or at least about 3000 g/mol or at least about 3500 g/mol or at least about 4000 g/mol or at least about 4500 g/mol or even at least about 5000 g/mol. According to still other embodiments, the parent polyoxypropylene ether polyol may have a molecular mass of not greater than about 12000 g/mol, such as, not greater than about 11750 g/mol or not greater than about 11500 g/mol or not greater than about 11250 g/mol or not greater than about 11000 g/mol or not greater than about 10750 g/mol or even not greater than about 10500 g/mol. It will be appreciated that the molecular mass of the parent polyoxypropylene ether polyol may be within a range between any of the minimum and maximum values noted above. It will be further appreciated that the molecular mass of the parent polyoxypropylene ether polyol may be any value between any of the minimum and maximum values noted above.

According to still other embodiments, the polyurethane foam may further include a fourth polyol component. According to still other embodiments, the fourth polyol component comprises a polycaprolactone polyol.

According to certain embodiments, the polyurethane foam may include a particular content of fourth polyol component. For example, the polyurethane foam may include a content of the fourth polyol component of at least about 1 wt. % for a total weight of the polyurethane foam, such as, at least about 3 wt. % or at least about 5 wt. % or at least about 8 wt. % or at least about 10 wt. % or at least about 13 wt. % or even at least about 15 wt. %. According to yet other embodiments, the polyurethane foam may include a content of the fourth polyol component of not greater than about 25 wt. % for a total weight of the polyurethane foam, such as, not greater than about 24 wt. % or not greater than about 23 wt. % or not greater than about 22 wt. % or not greater than about 21 wt. % or not greater than about 20 wt. % or not greater than about 19 wt. % or not greater than about 18 wt. % or not greater than about 17 wt. % or even not greater than about 16 wt. %. It will be appreciated that the content of the fourth polyol component in the polyurethane foam may be within a range between any of the minimum and maximum values noted above. It will be further appreciated that the content of the fourth polyol component in the polyurethane foam may be any value between any of the minimum and maximum values noted above.

According to yet other embodiments, the fourth polyol component may have a particular OH number. For example, the fourth polyol component may have an OH number of at least about 40 KOH mg/g, such as, at least about 43 KOH mg/g or at least about 45 KOH mg/g or at least about 48 KOH mg/g or even at least about 50 KOH mg/g. According to still other embodiments, the fourth polyol component may have an OH number of not greater than about 600 KOH mg/g, such as, not greater than about 550 KOH mg/g or not greater than about 500 KOH mg/g or not greater than about 450 KOH mg/g. It will be appreciated that the OH number of the fourth polyol component may be within a range between any of the minimum and maximum values noted above. It will be further appreciated that the OH number of the fourth polyol component may be any value between any of the minimum and maximum values noted above.

According to still other embodiments, the fourth polyol component may have a particular functionality. For example, the third polyol component may have a functionality of at least about 2. According to still other embodiments, the fourth polyol component may have a functionality of not greater than about 4. It will be appreciated that the functionality of the fourth polyol component may be within a range between any of the minimum and maximum values noted above. It will be further appreciated that the functionality of the fourth polyol component may be any value between any of the minimum and maximum values noted above.

According to other embodiments, the fourth polyol component may have a particular molecular mass. For example, the fourth polyol component may have a molecular mass of at least about 200 g/mol, such as, at least about 210 g/mol or at least about 220 g/mol or at least about 230 g/mol or at least about 240 g/mol or at least about 250 g/mol or at least about 260 g/mol or even at least about 270 g/mol. According to still other embodiments, the fourth polyol component may have a molecular mass of not greater than about 2000 g/mol, such as, not greater than about 1900 g/mol or not greater than about 1800 g/mol or not greater than about 1700 g/mol or not greater than about 1600 g/mol or not greater than about 1500 g/mol or not greater than about 1400 g/mol or even not greater than about 1300 g/mol. It will be appreciated that the molecular mass of the fourth polyol component may be within a range between any of the minimum and maximum values noted above. It will be further appreciated that the molecular mass of the fourth polyol component may be any value between any of the minimum and maximum values noted above.

According to still other embodiments, the polyurethane foam may further include a catalyst component.

According to still other embodiments, the catalyst component may include metal catalysts containing metal component such as tin, cooper, lead, zinc, cobalt, or nickel, and amine catalysts such as tertiary amine or quaternary ammonium salt.

According to certain embodiments, the polyurethane foam may include a particular content of catalyst component. For example, the polyurethane foam may include a content of the catalyst component of at least about 0.1 wt. % for a total weight of the polyurethane foam, such as, at least about 0.25 wt. % or at least about 0.5 wt. % or at least about 0.75 wt. % or at least about 1.0 wt. % or at least about 1.25 wt. % or even at least about 1.5 wt. %. According to yet other embodiments, the polyurethane foam may include a content of the catalyst component of not greater than about 5 wt. % for a total weight of the polyurethane foam, such as, not greater than about 4.75 wt. % or not greater than about 4.5 wt. % or not greater than about 4.25 wt. % or not greater than about 4.0 wt. % or not greater than about 3.75 wt. % or not greater than about 3.5 wt. % or not greater than about 3.25 wt. % or not greater than about 3.0 wt. % or not greater than about 2.75 wt. % or not greater than about 2.5 wt. % or not greater than about 2.25 wt. % or even not greater than about 2.0 wt. %. It will be appreciated that the content of the catalyst component in the polyurethane foam may be within a range between any of the minimum and maximum values noted above. It will be further appreciated that the content of the catalyst component in the polyurethane foam may be any value between any of the minimum and maximum values noted above.

According to still other embodiments, the polyurethane foam may further include a filler component.

According to certain embodiments, the polyurethane foam may include a particular content of filler component. For example, the polyurethane foam may include a content of the filler component of at least about 0.1 wt. % for a total weight of the polyurethane foam, such as, at least about 0.25 wt. % or at least about 0.5 wt. % or at least about 0.75 wt. % or at least about 1.0 wt. % or at least about 1.25 wt. % or even at least about 1.5 wt. %. According to yet other embodiments, the polyurethane foam may include a content of the filler component of not greater than about 40 wt. % for a total weight of the polyurethane foam, such as, not greater than about 37 wt. % or not greater than about 35 wt. % or not greater than about 32 wt. % or not greater than about 30 wt. % or not greater than about 27 wt. % or not greater than about 25 wt. % or not greater than about 22 wt. % or even not greater than about 20 wt. %. It will be appreciated that the content of the filler component in the polyurethane foam may be within a range between any of the minimum and maximum values noted above. It will be further appreciated that the content of the filler component in the polyurethane foam may be any value between any of the minimum and maximum values noted above.

According to still other embodiments, the polyurethane foam may further include a chain extender component.

According to still other embodiments, the chain extender component may include compounds with at least two isocyanate reactive groups such as diethylene glycol, triethylene glycol, dipropylene glycol, or tri propylene glycol.

According to certain embodiments, the polyurethane foam may include a particular content of chain extender component. For example, the polyurethane foam may include a content of the chain extender component of at least about 0.1 wt. % for a total weight of the polyurethane foam, such as, at least about 0.25 wt. % or at least about 0.5 wt. % or at least about 0.75 wt. % or at least about 1.0 wt. % or at least about 1.25 wt. % or even at least about 1.5 wt. %. According to yet other embodiments, the polyurethane foam may include a content of the chain extender component of not greater than about 7 wt. % for a total weight of the polyurethane foam, such as, not greater than about 6.5 wt. % or not greater than about 6.0 wt. % or not greater than about 5.5 wt. % or not greater than about 5.0 wt. % or not greater than about 4.5 wt. % or not greater than about 4.0 wt. % or even not greater than about 3.5 wt. %. It will be appreciated that the content of the chain extender component in the polyurethane foam may be within a range between any of the minimum and maximum values noted above. It will be further appreciated that the content of the chain extender component in the polyurethane foam may be any value between any of the minimum and maximum values noted above.

According to still other embodiments, the polyurethane foam may further include a surfactant agent component.

According to still other embodiments, the surfactant agent component may include aerosol, bentonite, polyuria compounds or combinations thereof.

According to certain embodiments, the polyurethane foam may include a particular content of surfactant component. For example, the polyurethane foam may include a content of the surfactant component of at least about 0.1 wt. % for a total weight of the polyurethane foam, such as, at least about 0.25 wt. % or at least about 0.5 wt. % or at least about 0.75 wt. % or at least about 1.0 wt. % or at least about 1.25 wt. % or even at least about 1.5 wt. %. According to yet other embodiments, the polyurethane foam may include a content of the surfactant component of not greater than about 7 wt. % for a total weight of the polyurethane foam, such as, not greater than about 6.5 wt. % or not greater than about 6.0 wt. % or not greater than about 5.5 wt. % or not greater than about 5.0 wt. % or not greater than about 4.5 wt. % or not greater than about 4.0 wt. % or even not greater than about 3.5 wt. %. It will be appreciated that the content of the surfactant component in the polyurethane foam may be within a range between any of the minimum and maximum values noted above. It will be further appreciated that the content of the surfactant component in the polyurethane foam may be any value between any of the minimum and maximum values noted above.

According to still other embodiments, the polyurethane foam may further include an isocyanate component.

According to still other embodiments, the isocyanate component may include monomeric methylenediphenyl diisocyanate (MDI), modified MDI, polymeric MDI and combinations thereof.

According to certain embodiments, the polyurethane foam may include a particular content of isocyanate component. For example, the polyurethane foam may include a content of the isocyanate component of at least about 7.0 wt. % for a total weight of the polyurethane foam, such as, at least about 8 wt. % or at least about 10 wt. % or at least about 11 wt. % or at least about 12 wt. % or at least about 13 wt.

% or at least about 14 wt. % or even at least about 15 wt. %. According to yet other embodiments, the polyurethane foam may include a content of the isocyanate component of not greater than about 40 wt. % for a total weight of the polyurethane foam, such as, not greater than about 39 wt. % or not greater than about 38 wt. % or not greater than about 37 wt. % or not greater than about 35 wt. % or even not greater than about 34 wt. %. It will be appreciated that the content of the isocyanate component in the polyurethane foam may be within a range between any of the minimum and maximum values noted above. It will be further appreciated that the content of the isocyanate component in the polyurethane foam may be any value between any of the minimum and maximum values noted above.

According to yet other embodiments, the polyurethane foam may have a particular thickness. For example, the polyurethane foam may have a thickness of at least about 0.5 mm, such as, at least about 0.55 mm or at least about 0.6 mm or at least about 0.65 mm or at least about 0.7 mm or even at least about 0.75 mm. According to still other embodiments, the polyurethane foam may have a thickness of not greater than about 15 mm, such as, not greater than about 14.5 mm or not greater than about 14.0 mm or not greater than about 13.5 mm or not greater than about 13.0 mm or not greater than about 12.5 mm or not greater than about 12.0 mm or not greater than about 11.5 mm or not greater than about 11.0 mm or not greater than about 10.5 mm or not greater than about 10.0 mm or not greater than about 9.5 mm or not greater than about 9.0 mm or not greater than about 8.5 mm or not greater than about 8.0 mm or not greater than about 7.5 mm or not greater than about 7.0 mm or not greater than about 6.5 mm or not greater than about 6.0 mm or not greater than about 5.5 mm or not greater than about 5.0 mm or not greater than about 4.5 mm or not greater than about 4.0 mm or not greater than about 3.5 mm or not greater than about 3.0 mm or not greater than about 2.5 mm or not greater than about 2.0 mm or not greater than about 1.5 mm or even not greater than about 1.0 mm. It will be appreciated that the thickness of the polyurethane foam may be within a range between any of the minimum and maximum values noted above. It will be further appreciated that the thickness of the polyurethane foam may be any value between any of the minimum and maximum values noted above.

Referring now to a particular use of the polyurethane foam formed according to embodiments described herein, a particular embodiment may include a battery compression pad that may include a polyurethane foam. It will be appreciated that the polyurethane foam of the battery compression pad may be formed according to any of the embodiments described herein. It will be further appreciated that the polyurethane foam of the batter compression pad may include any of the components described in reference to any of the embodiments described herein. It will be still further appreciated that the polyurethane foam of the battery compression pad may include any of the characteristics described in reference to embodiments described herein.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

Embodiment 1. A polyurethane foam comprising: a first polyol component comprising at least one component selected from the group of a polyether polyol and a polyester polyol, a second polyol component comprising a polyether polyol, a third polyol component comprising a grafted polyether polyol, and wherein the polyurethane foam comprises a density of at least about 100 kg/m³ and not greater than about 800 kg/m³, and wherein the polyurethane foam comprises an adjusted compression force deflection to density ratio of at least about 0.3, where the adjusted compression force deflection to density ratio is equal to CFD70/(D^2.6), where the CFD70 is equal to the compression force deflection of the polyurethane foam in Pa measured at 23° C., 70% compressive strain, and D is equal to the density of the polyurethane foam in kg/m³.

Embodiment 2. The polyurethane foam of embodiment 1, wherein the polyurethane foam comprises an adjusted compression force deflection to density ratio of at least about 0.4 or at least about 0.5 or at least about 0.6 or at least about 0.7.

Embodiment 3. The polyurethane foam of embodiment 1, wherein the polyurethane foam comprises an adjusted compression force deflection to density ratio of not greater than about 2.5 or not greater than about 2.3.

Embodiment 4. The polyurethane foam of embodiment 1, wherein the polyurethane foam comprises a glass transition temperature of at least about 10° C.

Embodiment 5. The polyurethane foam of embodiment 1, wherein the polyurethane foam comprises a glass transition temperature of not greater than about 85° C.

Embodiment 6. The polyurethane foam of embodiment 1, wherein the polyurethane foam comprises a density of at least about 100 kg/m³ or at least about 125 kg/m³ or at least about 150 kg/m³ or at least about 175 kg/m³ or at least about 200 kg/m³ or at least about 225 kg/m³ or at least about 250 kg/m³ or at least about 275 kg/m³ or at least about 300 kg/m³ or at least about 325 kg/m³ or at least about 350 kg/m³ or at least about 375 kg/m³ or at least about 400 kg/m³ or at least about 425 kg/m³ or at least about 475 kg/m³ or at least about 500 kg/m³.

Embodiment 7. The polyurethane foam of embodiment 1, wherein the polyurethane foam comprises a density of not greater than about 790 kg/m³ or not greater than about 780 kg/m³ or not greater than about 770 kg/m³ or not greater than about 760 kg/m³ or not greater than about 750 kg/m³ or not greater than about 740 kg/m³ or not greater than about 730 kg/m³ or not greater than about 720 kg/m³ or not greater than about 710 kg/m³ or not greater than about 700 kg/m³.

Embodiment 8. The polyurethane foam of embodiment 1, wherein the polyurethane foam comprises compression recovery ratio of not greater than about 95.5%.

Embodiment 9. The polyurethane foam of embodiment 1, wherein the first polyol component comprises an OH number of at least about 20 KOH mg/g.

Embodiment 10. The polyurethane foam of embodiment 1, wherein the first polyol component comprises an OH number of not greater than about 100 KOH mg/g.

Embodiment 11. The polyurethane foam of embodiment 1, wherein the first polyol component comprises a molecular mass of at least about 2000 g/mol.

Embodiment 12. The polyurethane foam of embodiment 1, wherein the first polyol component comprises a molecular mass of not greater than about 8000 g/mol.

Embodiment 13. The polyurethane foam of embodiment 1, wherein the first polyol component comprises a functionality of at least 2.

Embodiment 14. The polyurethane foam of embodiment 1, wherein the first polyol component comprises a functionality of not greater than 8.

Embodiment 15. The polyurethane foam of embodiment 1, wherein the polyurethane foam comprises first polyol component content of at least about 1 wt. % for a total weight of the polyurethane foam.

Embodiment 16. The polyurethane foam of embodiment 1, wherein the polyurethane foam comprises a first polyol component content of not greater than about 50 wt. % for a total weight of the polyurethane foam.

Embodiment 17. The polyurethane foam of embodiment 1, wherein the first polyol component is produced by a condensation of polycarboxylic acids (and/or polycarboxylic acid derivatives) with polyhydric alcohols (and/or polyhydric alcohol derivatives), or by ring-opening polymerization of epoxy compounds in the presence of active hydrogen-containing compounds as initiators and catalysts.

Embodiment 18. The polyurethane foam of embodiment 1, wherein the second polyol component comprises an OH number of at least about 200 KOH mg/g.

Embodiment 19. The polyurethane foam of embodiment 1, wherein the second polyol component comprises an OH number of not greater than about 800 KOH mg/g.

Embodiment 20. The polyurethane foam of embodiment 1, wherein the second polyol component comprises a molecular mass of at least about 200 g/mol.

Embodiment 21. The polyurethane foam of embodiment 1, wherein the second polyol component comprises a molecular mass of not greater than about 2000 g/mol.

Embodiment 22. The polyurethane foam of embodiment 1, wherein the second polyol component comprises a functionality of at least about 3.

Embodiment 23. The polyurethane foam of embodiment 1, wherein the second polyol component comprises a functionality of not greater than about 8.

Embodiment 24. The polyurethane foam of embodiment 1, wherein the polyurethane foam comprises a second polyol component content of at least about 1.0 wt. % for a total weight of the polyurethane foam.

Embodiment 25. The polyurethane foam of embodiment 1, wherein the polyurethane foam comprises a second polyol component content of not greater than about 20.0 wt. % for a total weight of the polyurethane foam.

Embodiment 26. The polyurethane foam of embodiment 1, wherein the third polyol component comprises a solid content by weight of at least about 10 wt. %.

Embodiment 27. The polyurethane foam of embodiment 1, wherein the third polyol component comprises a solid content by weight of not greater than about 60 wt. %.

Embodiment 28. The polyurethane foam of embodiment 1, wherein the third polyol component is produced by a graft polymerization of parent polyoxypropylene ether polyol and vinyl monomer in the presence of an initiator.

Embodiment 29. The polyurethane foam of embodiment 28, wherein the parent polyoxypropylene ether polyol comprises a molecular mass of at least about 2000 g/mol.

Embodiment 30. The polyurethane foam of embodiment 28, wherein the parent polyoxypropylene ether polyol comprises a molecular mass of not greater than about 12000 g/mol.

Embodiment 31. The polyurethane foam of embodiment 28, wherein the parent polyoxypropylene ether polyol comprises a functionality of at least about 2.

Embodiment 32. The polyurethane foam of embodiment 28, wherein the parent polyoxypropylene ether polyol comprises a functionality of not greater than about 4.

Embodiment 33. The polyurethane foam of embodiment 1, wherein the polyurethane foam comprises a third polyol component content of at least about 1.0 wt. % for a total weight of the polyurethane foam.

Embodiment 34. The polyurethane foam of embodiment 1, wherein the polyurethane foam comprises a third polyol component content of not greater than about 50.0 wt. % for a total weight of the polyurethane foam.

Embodiment 35. The polyurethane foam of embodiment 1, wherein the polyurethane form further comprises a fourth polyol component and wherein the fourth polyol component comprises at least one component select from the group of a polyether polyol, a polyester polyol and a polycaprolactone polyol.

Embodiment 36. The polyurethane foam of embodiment 35, wherein the fourth polyol component has a lower molecular weight than the first polyol component.

Embodiment 37. The polyurethane foam of embodiment 35, wherein the fourth polyol component has a lower functionality than the second polyol component.

Embodiment 38. The polyurethane foam of embodiment 35, wherein the fourth polyol component comprises an OH number of at least about 40 KOH mg/g.

Embodiment 39. The polyurethane foam of embodiment 1, wherein the fourth polyol component comprises an OH number of not greater than about 600 KOH mg/g.

Embodiment 40. The polyurethane foam of embodiment 35, wherein the fourth polyol component comprises a molecular mass of at least about 200 g/mol.

Embodiment 41. The polyurethane foam of embodiment 35, wherein the fourth polyol component comprises a molecular mass of not greater than about 2000 g/mol.

Embodiment 42. The polyurethane foam of embodiment 35, wherein the fourth polyol component comprises a functionality of at least about 2.

Embodiment 43. The polyurethane foam of embodiment 35, wherein the fourth polyol component comprises a functionality of not greater than about 4.

Embodiment 44. The polyurethane foam of embodiment 35, wherein the polyurethane foam comprises a fourth polyol component content of at least about 1.0 wt. % for a total weight of the polyurethane foam.

Embodiment 45. The polyurethane foam of embodiment 35, wherein the polyurethane foam comprises a fourth polyol component content of not greater than about 25.0 wt. % for a total weight of the polyurethane foam.

Embodiment 46. The polyurethane foam of embodiment 1, wherein the polyurethane foam comprises a catalyst.

Embodiment 47. The polyurethane foam of embodiment 46, wherein the polyurethane foam comprises a catalyst content of at least about 0.1 wt. % for a total weight of the polyurethane foam.

Embodiment 48. The polyurethane foam of embodiment 46, wherein the polyurethane foam comprises a catalyst content of not greater than about 1.5 wt. % for a total weight of the polyurethane foam.

Embodiment 49. The polyurethane foam of embodiment 1, wherein the polyurethane foam comprises a filler.

Embodiment 50. The polyurethane foam of embodiment 49, wherein the polyurethane foam comprises a filler content of at least about 0.1 wt. % for a total weight of the polyurethane foam.

Embodiment 51. The polyurethane foam of embodiment 49, wherein the polyurethane foam comprises a filler content of not greater than about 40.0 wt. % for a total weight of the polyurethane foam.

Embodiment 52. The polyurethane foam of embodiment 1, wherein the polyurethane foam comprises a chain extender.

Embodiment 53. The polyurethane foam of embodiment 52, wherein the polyurethane foam comprises a chain extender content of at least about 0.1 wt. % for a total weight of the polyurethane foam.

Embodiment 54. The polyurethane foam of embodiment 52, wherein the polyurethane foam comprises a chain extender content of not greater than about 7.0 wt. % for a total weight of the polyurethane foam.

Embodiment 55. The polyurethane foam of embodiment 1, wherein the polyurethane foam comprises a surfactant.

Embodiment 56. The polyurethane foam of embodiment 55, wherein the polyurethane foam comprises a surfactant content of at least about 0.1 wt. % for a total weight of the polyurethane foam.

Embodiment 57. The polyurethane foam of embodiment 55, wherein the polyurethane foam comprises a surfactant content of not greater than about 7.0 wt. % for a total weight of the polyurethane foam.

Embodiment 58. The polyurethane foam of embodiment 1, wherein the polyurethane foam comprises isocyanate.

Embodiment 59. The polyurethane foam of embodiment 58, wherein the polyurethane foam comprises an isocyanate content of at least about 15 wt. % for a total weight of the polyurethane foam.

Embodiment 60. The polyurethane foam of embodiment 1, wherein the polyurethane foam comprises an isocyanate content of not greater than about 40 wt. % for a total weight of the polyurethane foam.

Embodiment 61. A method of forming a polyurethane foam comprising: providing a raw material mixture comprising: a raw first polyol component comprising at least one component selected from the group of a polyether polyol and a polyester polyol, a raw second polyol component comprising a polyether polyol, a raw third polyol component comprising a grafted polyether polyol, and a raw fourth polyol component comprising a polycaprolactone polyol; and forming the raw material mixture into a polyurethane foam, wherein the polyurethane foam comprises a density of at least about 100 $kg/m^3$ and not greater than about 800 $kg/m^3$, and wherein the polyurethane foam comprises an adjusted compression force deflection to density ratio of at least about 0.3, where the adjusted compression force deflection to density ratio is equal to CFD70/(D^2.6), where the CFD70 is equal to the compression force deflection of the polyurethane foam in Pa measured at 23° C., 70% compressive strain, and D is equal to the density of the polyurethane foam in $kg/m^3$.

Embodiment 62. The method of embodiment 61, wherein the polyurethane foam comprises an adjusted compression force deflection to density ratio of at least about 0.4 or at least about 0.5 or at least about 0.6 or at least about 0.7.

Embodiment 63. The method of embodiment 61, wherein the polyurethane foam comprises an adjusted compression force deflection to density ratio of not greater than about 2.5 or not greater than about 2.3.

Embodiment 64. The method of embodiment 61, wherein the polyurethane foam comprises a glass transition temperature of at least about 10° C.

Embodiment 65. The method of embodiment 61, wherein the polyurethane foam comprises a glass transition temperature of not greater than about 85° C.

Embodiment 66. The method of embodiment 61, wherein the polyurethane foam comprises a density of at least about 100 $kg/m^3$ or at least about 125 $kg/m^3$ or at least about 150 $kg/m^3$ or at least about 175 $kg/m^3$ or at least about 200 $kg/m^3$ or at least about 225 $kg/m^3$ or at least about 250 $kg/m^3$ or at least about 275 $kg/m^3$ or at least about 300 $kg/m^3$ or at least about 325 $kg/m^3$ or at least about 350 $kg/m^3$ or at least about 375 $kg/m^3$ or at least about 400 $kg/m^3$ or at least about 425 $kg/m^3$ or at least about 475 $kg/m^3$ or at least about 500 $kg/m^3$.

Embodiment 67. The method of embodiment 61, wherein the polyurethane foam comprises a density of not greater than about 790 $kg/m^3$ or not greater than about 780 $kg/m^3$ or not greater than about 770 $kg/m^3$ or not greater than about 760 $kg/m^3$ or not greater than about 750 $kg/m^3$ or not greater than about 740 $kg/m^3$ or not greater than about 730 $kg/m^3$ or not greater than about 720 $kg/m^3$ or not greater than about 710 $kg/m^3$ or not greater than about 700 $kg/m^3$.

Embodiment 68. The method of embodiment 61, wherein the polyurethane foam comprises compression recovery ratio of not less than about 95.5%.

Embodiment 69. The method of embodiment 61, wherein the raw first polyol component comprises an OH number of at least about 20 KOH mg/g.

Embodiment 70. The method of embodiment 61, wherein the raw first polyol component comprises an OH number of not greater than about 100 KOH mg/g.

Embodiment 71. The method of embodiment 61, wherein the raw first polyol component comprises a molecular mass of at least about 2000 g/mol.

Embodiment 72. The method of embodiment 61, the raw first polyol component comprises a molecular mass of not greater than about 8000 g/mol.

Embodiment 73. The method of embodiment 61, wherein the raw first polyol component comprises a functionality of at least 2.

Embodiment 74. The method of embodiment 61, wherein the raw first polyol component comprises a functionality of not greater than 8.

Embodiment 75. The method of embodiment 61, wherein the raw material mixture comprises raw first polyol component content of at least about 1 wt. % for a total weight of the raw material mixture.

Embodiment 76. The method of embodiment 61, wherein the raw material mixture comprises a raw first polyol component content of not greater than about 50 wt. % for a total weight of the raw material mixture.

Embodiment 77. The method of embodiment 61, wherein the raw first polyol component is produced by a condensation of polycarboxylic acids (and/or polycarboxylic acid derivatives) with polyhydric alcohols (and/or polyhydric alcohol derivatives), or by ring-opening polymerization of epoxy compounds in the presence of active hydrogen-containing compounds as initiators and catalysts.

Embodiment 78. The method of embodiment 61, wherein the raw second polyol component comprises an OH number of at least about 200 KOH mg/g.

Embodiment 79. The method of embodiment 61, wherein the raw second polyol component comprises an OH number of not greater than about 800 KOH mg/g.

Embodiment 80. The method of embodiment 61, wherein the raw second polyol component comprises a molecular mass of at least about 200 g/mol.

Embodiment 81. The method of embodiment 61, wherein the raw second polyol component comprises a molecular mass of not greater than about 2000 g/mol.

Embodiment 82. The method of embodiment 61, wherein the raw second polyol component comprises a functionality of at least about 3.

Embodiment 83. The method of embodiment 61, wherein the raw second polyol component comprises a functionality of not greater than about 8.

Embodiment 84. The method of embodiment 61, wherein the raw material mixture comprises a raw second polyol component content of at least about 1.0 wt. % for a total weight of the raw material mixture.

Embodiment 85. The method of embodiment 61, wherein the raw material mixture comprises a raw second polyol component content of not greater than about 20.0 wt. % for a total weight of the raw material mixture.

Embodiment 86. The method of embodiment 61, wherein the raw third polyol component comprises a solid content by weight of at least about 10 wt. %.

Embodiment 87. The method of embodiment 61, wherein the raw third polyol component comprises a solid content by weight of not greater than about 60 wt. %.

Embodiment 88. The method of embodiment 61, wherein the raw third polyol component is produced by a graft polymerization of parent polyoxypropylene ether polyol and vinyl monomer in the presence of an initiator.

Embodiment 89. The method of embodiment 88, wherein the parent polyoxypropylene ether polyol comprises a molecular mass of at least about 2000 g/mol.

Embodiment 90. The method of embodiment 88, wherein the parent polyoxypropylene ether polyol comprises a molecular mass of not greater than about 12000 g/mol.

Embodiment 91. The method of embodiment 88, wherein the parent polyoxypropylene ether polyol comprises a functionality of at least about 2.

Embodiment 92. The method of embodiment 88, wherein the parent polyoxypropylene ether polyol comprises a functionality of not greater than about 4.

Embodiment 93. The method of embodiment 61, wherein the raw material mixture comprises a raw third polyol component content of at least about 1.0 wt. % for a total weight of the raw material mixture.

Embodiment 94. The method of embodiment 61, wherein the raw material mixture comprises a raw third polyol component content of not greater than about 50.0 wt. % for a total weight of the raw material mixture.

Embodiment 95. The method of embodiment 61, wherein the raw material mixture further comprises a raw fourth polyol component and wherein the raw fourth polyol component comprises at least one component select from the group of a polyether polyol, a polyester polyol and a polycaprolactone polyol.

Embodiment 96. The method of embodiment 95, wherein the raw fourth polyol component has a lower molecular weight than the raw first polyol component.

Embodiment 97. The method of embodiment 95, wherein the raw fourth polyol component has a lower functionality than the raw second polyol component.

Embodiment 98. The method of embodiment 95, wherein the raw fourth polyol component comprises an OH number of at least about 40 KOH mg/g.

Embodiment 99. The method of embodiment 95, wherein the raw fourth polyol component comprises an OH number of not greater than about 600 KOH mg/g.

Embodiment 100. The method of embodiment 95, wherein the raw fourth polyol component comprises a molecular mass of at least about 200 g/mol.

Embodiment 101. The method of embodiment 95, wherein the raw fourth polyol component comprises a molecular mass of not greater than about 2000 g/mol.

Embodiment 102. The method of embodiment 95, wherein the raw fourth polyol component comprises a functionality of at least about 2.

Embodiment 103. The method of embodiment 95, wherein the raw fourth polyol component comprises a functionality of not greater than about 4.

Embodiment 104. The method of embodiment 95, wherein the raw material mixture comprises a raw fourth polyol component content of at least about 1.0 wt. % for a total weight of the raw material mixture.

Embodiment 105. The method of embodiment 61, wherein the raw material mixture comprises a raw fourth polyol component content of not greater than about 25.0 wt. % for a total weight of the raw material mixture.

Embodiment 106. The method of embodiment 61, wherein the raw material mixture comprises a raw catalyst.

Embodiment 107. The method of embodiment 106, wherein the raw material mixture comprises a raw catalyst content of at least about 0.1 wt. % for a total weight of the raw material mixture.

Embodiment 108. The method of embodiment 106, wherein the raw material mixture comprises a raw catalyst content of not greater than about 1.5 wt. % for a total weight of the raw material mixture.

Embodiment 109. The method of embodiment 61, wherein the raw material mixture comprises a raw filler.

Embodiment 110. The method of embodiment 109, wherein the raw material mixture comprises a raw filler content of at least about 0.1 wt. % for a total weight of the raw material mixture.

Embodiment 111. The method of embodiment 109, wherein the raw material mixture comprises a raw filler content of not greater than about 40.0 wt. % for a total weight of the raw material mixture.

Embodiment 112. The method of embodiment 61, wherein the raw material mixture comprises a raw chain extender.

Embodiment 113. The method of embodiment 112, wherein the raw material mixture comprises a raw chain extender content of at least about 0.1 wt. % for a total weight of the raw material mixture.

Embodiment 114. The method of embodiment 112, wherein the raw material mixture comprises a raw chain extender content of not greater than about 7.0 wt. % for a total weight of the raw material mixture.

Embodiment 115. The method of embodiment 61, wherein the raw material mixture comprises a raw surfactant.

Embodiment 116. The method of embodiment 115, wherein the raw material mixture comprises a raw surfactant content of at least about 0.1 wt. % for a total weight of the raw material mixture.

Embodiment 117. The method of embodiment 115, wherein the raw material mixture comprises a raw surfactant content of not greater than about 7.0 wt. % for a total weight of the raw material mixture.

Embodiment 118. The method of embodiment 61, wherein the raw material mixture comprises raw isocyanate.

Embodiment 119. The method of embodiment 118, wherein the raw material mixture comprises a raw isocyanate content of at least about 15 wt. % for a total weight of the raw material mixture.

Embodiment 120. The method of embodiment 118, wherein the raw material mixture comprises a raw isocyanate content of not greater than about 40 wt. % for a total weight of the raw material mixture.

EXAMPLES

The concepts described herein will be further described in the following Examples, which do not limit the scope of the invention described in the claims.

Example 1

Sample polyurethane foams S1-S6 were formed according to embodiments described herein and comparative samples CS1-CS3 were formed for comparison to the samples S1-S6. The compositions of sample polyurethane foams S1-S6 and comparative samples CS1-CS3 are summarized in Table 1 below.

TABLE 1

| Component | S1 (wt. % for a total weight of the sample) | S2 (wt. % for a total weight of the sample) | S3 (wt. % for a total weight of the sample) | S4 (wt. % for a total weight of the sample) | S5 (wt. % for a total weight of the sample) | S6 (wt. % for a total weight of the sample) | CS1 (wt. % for a total weight of the sample) | CS2 (wt. % for a total weight of the sample) | CS3 (wt. % for a total weight of the sample) |
|---|---|---|---|---|---|---|---|---|---|
| Polyol 1 | 18.65 | 17.20 | | 16.52 | | 7.05 | | 18.11 | 53.79 |
| Polyol 2 | 7.16 | 8.00 | 9.85 | 14.53 | | 14.11 | 11.60 | 0.00 | 0.00 |
| Polyol 3 | 10.36 | 10.00 | 15.76 | 26.43 | 37.11 | 29.62 | 48.88 | 19.32 | 0.00 |
| Polyol 4 | 7.46 | 8.00 | 15.76 | | 0.00 | 9.87 | 0.00 | 15.10 | 15.73 |
| Polyol 5 | | | 15.76 | | | | | | |
| Polyol 6 | | | | 6.61 | | | | | |
| Polyol 7 | | | | | 9.24 | | | | |
| Polyol 8 | | | | | 25.98 | | | | |
| Chain extender | 2.49 | 2.60 | 1.58 | 2.64 | 1.36 | 2.12 | 2.49 | 7.25 | 2.28 |
| Surfactant | 1.04 | 1.00 | 4.73 | 3.46 | 4.08 | 4.25 | 4.99 | 3.63 | 4.70 |
| Catalyst | 0.43 | 0.41 | 0.65 | 0.74 | 0.75 | 0.71 | 0.85 | 0.97 | 0.00 |
| Isocyanate | 20.59 | 21.72 | 35.89 | 29.08 | 21.48 | 32.26 | 31.19 | 35.63 | 23.50 |
| Filler | 31.52 | 31.07 | 0.00 | 0.00 | 0.00 | 0.00 | 0.00 | 0.00 | 0.00 |

The properties of the polyols shown in Table 1 are summarized in Table 2 below.

TABLE 2

Polyol Property Summary

| Polyol # from Table 1 | Type of Polyol | Hydroxyl value (mg KOH/g) | Molecular Mass (g · mol⁻¹) | Functionality | Polyol Category |
|---|---|---|---|---|---|
| Polyol 1 | Polyether polyol | 54 | 3000 | 3 | First Polyol |
| Polyol 2 | Sucrose based polyol | 425 | 800 | 6-7 | Second Polyol |
| Polyol 3 | Styrene-acrylonitrile grafted polyether polyols (solid content, 45 wt. %) | 20 | 3000 (parent polyoxy-propylene ether polyol) | 3 (parent polyoxy-propylene ether polyol) | Third Polyol |
| Polyol 4 | Polyc aprolactone polyol | 212 | 500 | 2 | Fourth Polyol |
| Polyol 5 | Polyester polyol | 62 | 2500 | 2.6 | First Polyol |
| Polyol 6 | Polyether polyol | 168 | 1000 | 3 | Fourth Polyol |
| Polyol 7 | Polyether polyol | 490 | 450 | 4.5-5 | Second Polyol |
| Polyol 8 | Polyether polyol | 27.5 | 6000 | 3 | First Polyol |

The sample polyurethane foam was formed by mixing all the liquid components (including the first polyol, second polyol, third polyol, fourth polyol, chain extender, surfactant, catalyst) until the liquid phase is homogeneous. Then, any fillers were added to the liquid mixture. The combined mixture was then mixed until it reached a homogeneous composition. Finally, the isocyanate was added to the combined mixture. The final mixture was cured in an over at 170° C. oven for several minutes.

The sample polyurethane foam was tested to determine the density, compression force deflection (CFD) of the polyurethane foam measured at a 70% compression ratio, and glass transition temperature. Results for the tests are summarized in Table 3 below.

TABLE 3

| | | | | | Performance Parameters | | | | |
|---|---|---|---|---|---|---|---|---|---|
| Property | S1 | S2 | S3 | S4 | S5 | S6 | CS1 | CS2 | CS3 |
| Density (kg/m$^3$) | 508 | 490 | 155 | 362 | 680 | 410 | 170 | 160 | 425 |
| CFD$_{70}$ (Pa) | 5042140 | 6169595 | 291354 | 3517960 | 23022190 | 11329540 | 1854070 | 157817 | 1343546 |
| CFD70/D)^2.6 | 0.46 | 0.62 | 0.59 | 0.78 | 0.99 | 1.82 | 2.94 | 0.29 | 0.20 |
| Glass Transition Temperature (° C.) | 62.43 | 74.76 | 62.63 | 70.1 | 48.2 | 80.42 | 78.3 | 47.01 | 4.53 |
| Compression Recovery (%) | 1.39 | 3.62 | 0.79 | 0.93 | 0.41 | 2.25 | 4.91 | 0.53 | 0.27 |

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A polyurethane foam prepared from a reaction mixture, wherein the reaction mixture comprises:

a first polyol component having a molecular mass of at least about 2000 g/mol and not greater than about 5800 g/mol, and comprising at least one component selected from the group of a polyether polyol and a polyester polyol, a second polyol component comprising a polyether polyol, a third polyol component comprising a grafted polyether polyol, wherein the reaction mixture comprises the first polyol component in an amount of at least about 5 wt. % and not greater than about 50 wt. % for a total weight of the reaction mixture, wherein the reaction mixture comprises the second polyol component in an amount of at least about 7 wt. % for a total weight of the reaction mixture, wherein the reaction mixture comprises the third polyol component in an amount of at least about 1 wt. % and not greater than about 45 wt. % for a total weight of the reaction mixture, wherein the polyurethane foam has a glass transition temperature of at least about 10° C., wherein the polyurethane foam has a density of at least about 175 kg/m$^3$ and not greater than about 800 kg/m$^3$, and wherein the polyurethane foam has an adjusted compression force deflection to density ratio of at least about 0.3, where the adjusted compression force deflection to density ratio is equal to CFD70/(D^2.6), where the CFD70 is equal to the compression force deflection of the polyurethane foam in Pa measured at 23° C., 70% compressive strain, and D is equal to the density of the polyurethane foam in kg/m$^3$.

2. The polyurethane foam of claim 1, wherein the polyurethane foam has an adjusted compression force deflection to density ratio of at least about 0.4.

3. The polyurethane foam of claim 1, wherein the polyurethane foam has a glass transition temperature of at least about 10° C. and not greater than about 85° C.

4. The polyurethane foam of claim 1, wherein the polyurethane foam has a density of at least about 175 kg/m³ and not greater than about 790 kg/m³.

5. The polyurethane foam of claim 1, wherein the polyurethane foam has compression recovery ratio of not greater than about 95.5%.

6. The polyurethane foam of claim 1, wherein the first polyol component has an OH number of at least about 20 KOH mg/g and not greater than about 100 KOH mg/g.

7. The polyurethane foam of claim 1, wherein the first polyol component has a molecular mass of at least about 2,000 g/mol and not greater than about 3500 g/mol.

8. The polyurethane foam of claim 1, wherein the first polyol component has a functionality of at least 2 and not greater than 8.

9. The polyurethane foam of claim 1, wherein the reaction mixture comprises the third polyol component in an amount of at least about 1 wt % and not greater than about 28 wt. % for a total weight of the reaction mixture.

10. The polyurethane foam of claim 1, wherein the first polyol component is produced by a condensation of polycarboxylic acids with polyhydric alcohols, or by ring-opening polymerization of epoxy compounds in the presence of active hydrogen-containing compounds as initiators and catalysts.

11. The polyurethane foam of claim 1, wherein the second polyol component has an OH number of at least about 200 KOH mg/g and not greater than about 800 KOH mg/g.

12. The polyurethane foam of claim 1, wherein the second polyol component has a molecular mass of at least about 200 g/mol and not greater than about 2000 g/mol.

13. The polyurethane foam of claim 1, wherein the second polyol component has a functionality of at least about 3 and not greater than about 8.

14. A method of forming a polyurethane foam comprising:

providing a raw material mixture comprising: a raw first polyol component having a molecular mass of at least about 2000 g/mol and not greater than about 5800 g/mol, and comprising at least one component selected from the group of a polyether polyol and a polyester polyol, a raw second polyol component comprising a polyether polyol, a raw third polyol component comprising a grafted polyether polyol, a raw fourth polyol component comprising a polycaprolactone polyol; and forming the raw material mixture into a polyurethane foam, wherein the polyurethane foam comprises the raw first polyol component in an amount of at least about 5 wt. % and not greater than about 50 wt. % for a total weight of the raw material mixture, wherein the polyurethane foam comprises the raw second polyol component in an amount of at least about 7 wt. % for a total weight of the raw material mixture, wherein the polyurethane foam comprises the raw third polyol component in an amount of at least about 1 wt. % and not greater than about 45 wt. % for a total weight of the raw material mixture, wherein the polyurethane foam has a glass transition temperature of at least about 10° C., wherein the polyurethane foam has a density of at least about 175 kg/m³ and not greater than about 800 kg/m³, and wherein the polyurethane foam has an adjusted compression force deflection to density ratio of at least about 0.3, where the adjusted compression force deflection to density ratio is equal to $CFD70/(D^{2.6})$, where the CFD70 is equal to the compression force deflection of the polyurethane foam in Pa measured at 23° C., 70% compressive strain, and D is equal to the density of the polyurethane foam in kg/m³.

15. The method of claim 14, wherein the polyurethane foam has an adjusted compression force deflection to density ratio of at least about 0.4 and not greater than about 2.5.

16. The method of claim 14, wherein the polyurethane foam has a glass transition temperature of at least about 10° C. and not greater than about 85° C.

17. The method of claim 14, wherein the polyurethane foam has a density of at least about 175 kg/m³ and not greater than about 790 kg/m³.

18. The method of claim 14, wherein the polyurethane foam has a compression recovery ratio of not less than about 95.5%.

19. The method of claim 14, wherein the raw first polyol component has an OH number of at least about 20 KOH mg/g and not greater than about 100 KOH mg/g.

\* \* \* \* \*